(12) United States Patent
Eshima et al.

(10) Patent No.: US 9,112,341 B2
(45) Date of Patent: Aug. 18, 2015

(54) CABLE FIXING MEMBER AND CABLE FIXING STRUCTURE

(75) Inventors: Hirotaka Eshima, Hitachi (JP); Yoji Kobayashi, Hitachi (JP); Hideki Horikoshi, Hitachi (JP); Haruhiko Sugai, Toyota (JP); Satoshi Murata, Miyoshi (JP)

(73) Assignee: HITACHI METALS, LTD., Tokyo (JP)

(*) Notice: Subject to any disclaimer, the term of this patent is extended or adjusted under 35 U.S.C. 154(b) by 0 days.

(21) Appl. No.: 13/113,134

(22) Filed: May 23, 2011

(65) Prior Publication Data

US 2011/0315830 A1  Dec. 29, 2011

(30) Foreign Application Priority Data

Jun. 23, 2010 (JP) ................. 2010-142167

(51) Int. Cl.
*F16L 3/22* (2006.01)
*E05D 1/04* (2006.01)
*H02G 3/32* (2006.01)
*E05D 7/10* (2006.01)
*E05D 7/12* (2006.01)

(52) U.S. Cl.
CPC .. *H02G 3/32* (2013.01); *E05D 7/10* (2013.01); *E05D 7/1061* (2013.01); *E05D 7/1083* (2013.01); *E05D 7/12* (2013.01); *E05D 2007/128* (2013.01)

(58) Field of Classification Search
CPC .......... H02G 3/32; E05D 7/10; E05D 7/1061; E05D 7/1083; E05D 7/12; E05D 2007/128

USPC ............ 248/68.1, 49, 74.5; 16/355, 260–261, 16/267–271, 254
See application file for complete search history.

(56) References Cited

U.S. PATENT DOCUMENTS

| 824,544 A | * | 6/1906 | Hossege ...................... 248/58 |
| 2,302,661 A | * | 11/1942 | Benson ........................ 16/267 |
| 4,942,271 A | * | 7/1990 | Corsi et al. .................. 174/101 |

(Continued)

FOREIGN PATENT DOCUMENTS

| JP | S58-186277 | 12/1983 |
| JP | S6082065 | 5/1985 |

(Continued)

OTHER PUBLICATIONS

Office Action issued on Nov. 26, 2013 in the corresponding Japanese application (2010-142167) with English translation.

*Primary Examiner* — Christopher Garft
(74) *Attorney, Agent, or Firm* — Paul D. Bianco; Martin Fleit; Fleit Gibbons Gutman Bongini & Bianco PL

(57) ABSTRACT

A cable fixing member is provided including a pair of bracket members that hold a cable therebetween and a fitting part that fits into the pair of bracket members. The fitting part includes a convex portion having an arc-shaped cross sectional face formed in one bracket member of the pair of bracket members; and a concave portion formed in the other bracket of the pair of bracket members and having an arc-shaped cross sectional face with which the convex portion is fitted, wherein the pair of bracket members are rotatably formed with the fitting part as a rotation center, so that facing surfaces of the pair of bracket members that hold the cable can be opened and closed.

21 Claims, 7 Drawing Sheets

(56) References Cited

U.S. PATENT DOCUMENTS

| | | | |
|---|---|---|---|
| H001012 H * | 1/1992 | Senatro | 248/68.1 |
| 5,184,794 A * | 2/1993 | Saito | 248/68.1 |
| 5,261,633 A * | 11/1993 | Mastro | 248/74.1 |
| 5,494,245 A * | 2/1996 | Suzuki et al. | 248/74.1 |
| 5,544,849 A * | 8/1996 | Peterson et al. | 248/74.1 |
| 5,622,012 A * | 4/1997 | Schijf | 52/71 |
| 5,890,684 A * | 4/1999 | Stewart et al. | 248/68.1 |
| 5,979,016 A * | 11/1999 | Fan | 16/267 |
| 6,105,218 A * | 8/2000 | Reekie | 24/518 |
| 6,126,119 A * | 10/2000 | Giangrasso | 248/58 |
| 6,189,407 B1 * | 2/2001 | Champ et al. | 74/502.4 |
| 6,193,195 B1 * | 2/2001 | Owens | 248/68.1 |
| 6,434,803 B1 * | 8/2002 | Spong | 24/543 |
| 6,499,188 B1 * | 12/2002 | Cheng | 16/269 |
| 6,772,905 B2 * | 8/2004 | Cheng | 220/840 |
| 6,875,918 B2 * | 4/2005 | Sudo et al. | 174/363 |
| 6,892,990 B2 * | 5/2005 | Pisczak | 248/74.4 |
| 7,316,390 B2 * | 1/2008 | Burlison | 269/274 |
| 7,387,282 B2 * | 6/2008 | Kovac | 248/74.4 |
| 7,457,506 B1 * | 11/2008 | Osborne, II | 385/136 |
| 7,615,710 B2 * | 11/2009 | Sayres | 174/480 |
| 7,653,987 B2 * | 2/2010 | Tokuda et al. | 29/760 |
| 7,770,848 B2 * | 8/2010 | Johnson et al. | 248/65 |
| 7,878,790 B2 * | 2/2011 | Kidd | 425/318 |
| 8,183,471 B2 * | 5/2012 | Handler | 174/481 |
| 2002/0034366 A1 * | 3/2002 | Bourget | 385/112 |
| 2005/0116122 A1 * | 6/2005 | Nakanishi | 248/68.1 |
| 2006/0062080 A1 * | 3/2006 | Scott | 367/21 |
| 2007/0234559 A1 * | 10/2007 | Tokuda et al. | 29/755 |
| 2007/0295867 A1 * | 12/2007 | Hennon | 248/74.4 |
| 2011/0297797 A1 * | 12/2011 | Yelverton et al. | 248/70 |
| 2012/0056045 A1 * | 3/2012 | Franta | 248/49 |
| 2012/0111604 A1 * | 5/2012 | Eshima | 174/135 |
| 2012/0112014 A1 * | 5/2012 | Eshima et al. | 248/68.1 |

FOREIGN PATENT DOCUMENTS

| | | |
|---|---|---|
| JP | 3043892 | 12/1997 |
| JP | 2007276738 A | 10/2007 |

* cited by examiner

CABLE FIXING MEMBER AND CABLE FIXING STRUCTURE

The present application is based on Japanese Patent Application No. 2010-142167, filed on Jun. 23, 2010, the entire contents of which are hereby incorporated by reference.

BACKGROUND OF THE INVENTION

1. Field of the Invention

The present invention relates to a cable fixing member and a cable fixing structure for fixing a cable to a vehicle body, etc.

2. Description of the Related Art

When wiring of cable/electric wire (simply called "cable" hereafter) is laid, for example, when wiring is laid under a suspension of an automobile (called "under a vehicle spring" hereafter), an intermediate portion of a cable is held and fixed to a vehicle body side, to thereby prevent a contact between a tire and the other component, and the cable. A metal clamp is generally used as a fixing unit of the cable. The metal clamp holds an outer periphery of the cable from both sides by a pair of metal components, and fixes the metal component to a vehicle body, etc., by using a screw, etc., with the cable held by the metal components, to thereby hold the cable.

As an example of a the metal clamp in the past, patent document 1 discloses a clamp wherein although a movement of an electric wire in an axial direction is regulated, rotation thereof is allowed, in an electric wire holding device for holding the electric wire for supplying electric power to an in-wheel motor incorporated in a wheel. The clamp holds a buffer cylinder member fitted to an outer periphery of the electric wire and attached thereto by an adhesive agent, etc., from both sides by clamp body components, and rotatably supports the electric wire, with a bearing structure provided between the buffer cylinder member and the clamp body components. By allowing a rotation of the electric wire, breakage of the electric wire by repeated bending due to a vertical movement of the wheel is prevented.

(Patent document 1) Japanese Patent Laid Open Publication No. 2007-276738

Incidentally, a conventional metal clamp holds an outer peripheral side of the cable by a pair of clamp components (a base member and a pressing member, being clamp body components in the patent document 1) from both sides, and the metal clamp is attached to a vehicle body side at two places on both end sides by a bolt, etc. However, such a structure involves the following problem.

Namely, there is a problem that the metal clamp is sized up in a longitudinal direction, due to a fixing part fixed to both end sides of the metal clamp in a longitudinal direction (such as an arrangement direction of the cable) by a bolt, etc. Further, there are a plurality of fixing parts of the metal clamp (two places in the patent document 1), and therefore when a pair of clamp components that constitute metal clamps (a base member and a pressing member of the clamp body components in the patent document 1) are overlapped on each other, this is a work while considering a holding state of the cable. However, there is also a problem of a poor workability, such that it might be difficult to slightly adjust the holding state to solve a twisting of the cable held by the metal clamp. Such a poor workability leads to a poor reproducibility or a poor assembling accuracy of the cable in a positional relation between the cable and the metal clamp, and therefore improvement is desired in a viewpoint of keeping a constant quality.

BRIEF SUMMARY OF THE INVENTION

Therefore, in view of the above-described problems, an object of the present invention is to provide a cable fixing member and a cable fixing structure capable of realizing a miniaturization and excellent in workability in holding a cable.

A first aspect of the present invention provides a cable fixing member, comprising:

a pair of bracket members that hold a cable therebetween; and a fitting part that fits into the pair of bracket members, wherein the fitting part comprises:

a convex portion having an arc-shaped cross sectional face formed in one bracket member of the pair of bracket members; and a concave portion formed in the other bracket member of the pair of bracket members and having an arc-shaped cross sectional face with which the convex portion is fitted, wherein the pair of bracket members are rotatably formed with the fitting part as a rotation center, so that facing surfaces of the pair of bracket members that hold the cable can be opened and closed.

DETAILED DESCRIPTION OF THE INVENTION

An embodiment of a cable fixing member and a cable fixing structure of the present invention will be described hereafter.

First Embodiment

Figure 1A:
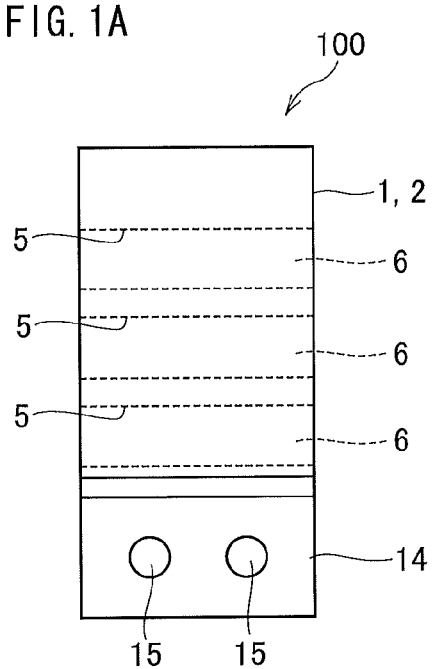
FIG. 1A is a front view showing a pair of bracket members in a cable fixing member according to a first embodiment of the present invention.
Figure 1B:
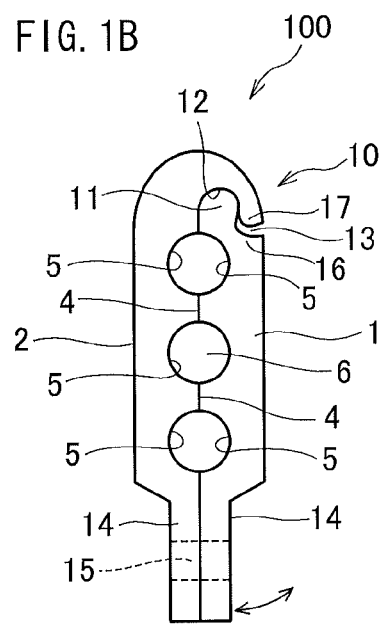
FIG. 1B is a side view showing a pair of bracket members in the cable fixing member according to the first embodiment of the present invention.
Figure 2:
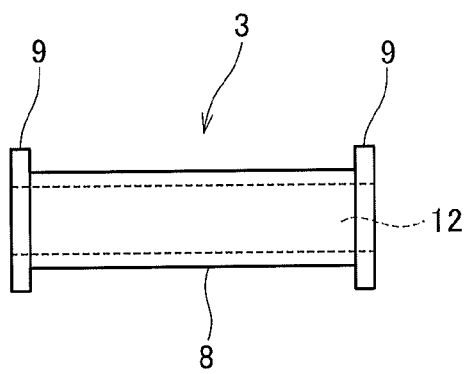
FIG. 2 is a front view showing an intermediate member in the cable fixing member according to the first embodiment of the present invention.

FIG. 1A and FIG. 1B show a pair of bracket members in a cable fixing member according to a first embodiment of the present invention, wherein FIG. 1A is a front view and FIG. 1B is a side view. Further, FIG. 2 is a front view showing an intermediate member in the cable fixing member according to the first embodiment.

As shown in FIG. 1A and FIG. 1B, a pair of bracket members that constitute a cable fixing member 100 of this embodiment are composed of a first bracket member 1 and a second bracket member 2. The first bracket member 1 and the second bracket member 2 are used for clamping three cables and fixing them to a vehicle body, etc., and three rows of grooves 5 for clamping the cables by holding them are respectively formed in facing surfaces (opposed clamping/holding surfaces) 4, 4 of the first bracket member 1 and the second bracket member 2. A transverse cross sectional face of a groove 5 is formed into a semi-circular shape, corresponding to a circular cable, and an outer periphery of the cable is clamped and held from both sides by the first bracket member 1 and the second bracket member 2. The three rows of the grooves 5 are formed in parallel to a width direction of the first bracket member 1 and the second bracket member 2. FIG. 1A and FIG. 1B show a state that the first bracket member 1 and the second bracket member 2 are fitted into each other, and facing surfaces 4, 4 of both are brought into a tight contact with each other, and a clamping hole 6 for clamping and fixing a cable (cable of a portion where the intermediate member 3 (see FIG. 2) in this embodiment is crimped and fastened), is formed between opposed grooves 5 and 5.

Note that the cable may also be clamped by being directly held by the first bracket member 1 and the second bracket member 2, not through the intermediate member 3. Further, the shape of a transverse cross sectional face of the groove formed on the facing surfaces of the first bracket member 1 and the second bracket member 2 may be, for example, a rectangular shape in accordance with the shape of the transverse cross sectional face of the cramped cable.

As shown in FIG. 1B, a fitting part 10 is formed in one end portion of the first bracket member 1 and the second bracket member 2 in a longitudinal direction (cable arrangement direction orthogonal to a direction of the groove 5). The fitting part 10 is composed of a convex portion 11 having an arc-shaped cross sectional face formed in the first bracket member 1, and a concave portion 12 having an arc-shaped cross sectional face formed in the second bracket member 2 so as to be fitted into the convex portion 11. A portion 16 adjacent to the convex portion 11, at the opposite side to the side of the facing surface 4 (the side away from the facing surface 4) of the convex portion 11 of the first bracket member 1, is formed into a concave state portion having an arc-shaped cross sectional face, and an S-shaped cross sectional shape is formed by the convex portion 11 and the portion 16 adjacent thereto with a concave state cross sectional face. Further, a portion 17 adjacent to the concave portion 12, at the opposite side to the facing surface 4 (the side away from the facing surface 4) of the concave portion 12 of the second bracket member 2, is formed into a convex state portion with an arc-shaped cross sectional face, and an S-shaped cross sectional shape is formed by the concave portion 12 and the portion 17 adjacent thereto with the convex state cross sectional face.

Further, as shown in FIG. 1B, a gap 13 is formed between the adjacent portion 16 with the concave state cross sectional face, and the adjacent portion 17 with the convex state cross sectional face, in a state of a tight contact between the facing surfaces 4 and 4, by fitting the first bracket member 1 and the second bracket member 2 (for example, chamfering in a curved state is applied). Therefore, the first bracket member 1 and the second bracket member 2 can be mutually rotated with the fitting part 10 as a rotation center, and by this rotation, the other end portion side of the first bracket member 1 and the second bracket member 2 can be opened and closed.

Note that if the gap (space) that allows a mutual rotation of the first bracket member 1 and the second bracket member 2 with the fitting part 10 as the rotation center, is formed between the convex portion and the portion 16 adjacent to the convex portion at the opposite side to the facing surface 4 side of the convex portion 11, and the concave portion and the portion 17 adjacent to the concave portion at the opposite side to the facing surface 4 side of the concave portion 12, for example, the adjacent portion 16 at the opposite side to the facing surface 4 of the convex portion 11 may be formed into not a projected cross sectional face but a planar shaped cross sectional face, and the convex portion 11 and the portion 16 adjacent thereto may not be formed into a S-shaped cross sectional shape.

Figure 4:
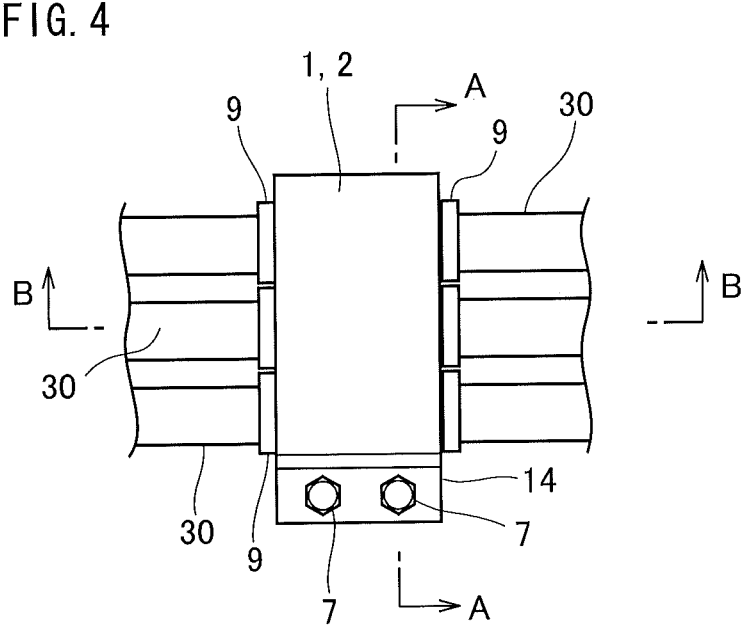
FIG. 4 is a view showing one of the procedures for fixing the cable by using the cable fixing member according to the first embodiment of the present invention.
Figure 5A:
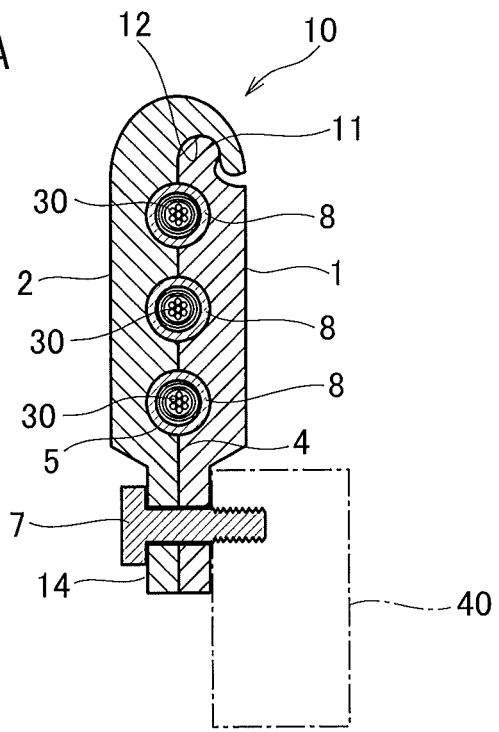
FIG. 5A is an expanded cross sectional view taken along the line A-A of FIG. 4.

An attachment part 14 is provided on the other end portion of the first bracket member 1 and the second bracket member 2 fitted by the fitting part 10 of one end portion and set in an open/close state, and through this attachment part 14, the cable clamped by the first bracket member 1 and the second bracket member 2 is fixed to an attachment member 40 of a vehicle body, etc., (see FIG. 5A). The bracket members 1 and 2 are fastened to the attachment part 14, in a direction of making the facing surfaces 4 and 4 brought into tight contact with each other, and a bolt 7 is provided, which is a tightening member for attaching and fixing the first bracket member 1 and the second bracket member 2 to the attachment member 40 of the vehicle body, etc. (see FIG. 4 and FIG. 5A). An insertion hole 15 for inserting the bolt 7 is formed in the attachment part 14. Two insertion holes 15 are provided side by side in a width direction of the first bracket member 1 and the second bracket member 2 in an example shown in the figure.

The intermediate member 3 in this embodiment is made of metal, and as shown in FIG. 2, has an insertion hole into which the cable is inserted, and includes a cylinder part 8 fastened to the cable by crimping, and a stopper part (protrusion part) 9 formed by protruding like a flange in a diameter direction on both end portions of the cylinder part 8. A length between the stopper parts 9 and 9 is set to the same as a width of the first bracket member 1 and the second bracket member 2 in a direction of the groove 5. Accordingly, when the cylinder 8 fastened to the cable 30 is held by the first bracket member 1 and the second bracket member 2, side faces of the first bracket member 1 and the second bracket member 2, and the stopper part 9 of the intermediate member 3 are set in a contact state.

Figure 3:
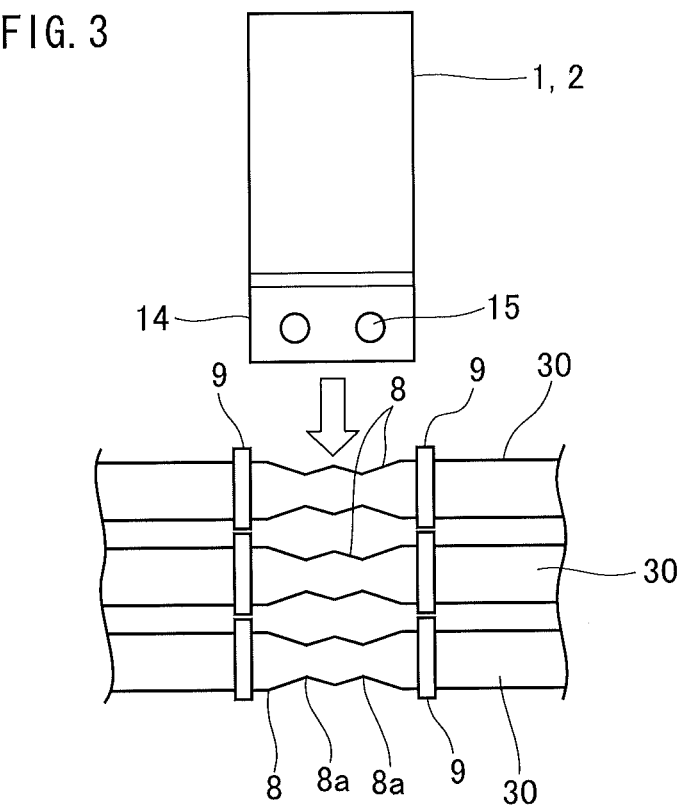
FIG. 3 is a view showing one of procedures for fixing a cable by using the cable fixing member according to the first embodiment of the present invention.
Figure 5B:
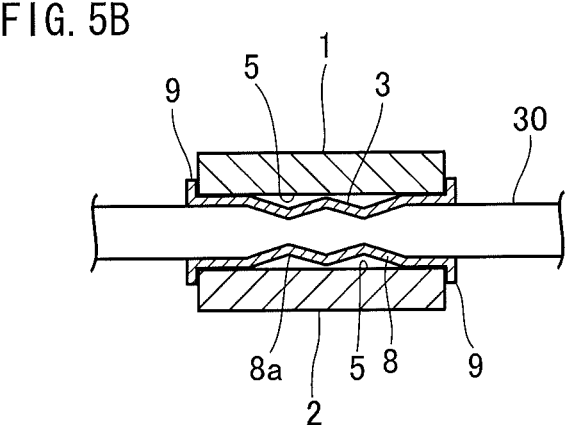
FIG. 5B is an expanded cross sectional view taken along the line B-B of FIG. 4.

Next, a procedure of attaching and fixing the cable to the fixing member will be described by using FIG. 3 to FIG. 5, depending on the cable fixing member of this embodiment. FIG. 3 and FIG. 4 are views showing the procedure of attaching and fixing the cable to the fixing member, and FIG. 5A is an expanded cross sectional view taken along the line A-A of FIG. 4, and FIG. 5B is an expanded cross sectional view taken along the line B-B of FIG. 4.

First, as shown in FIG. 3, the intermediate member 3 is mounted on a prescribed position of the three cables which are collectively clamped and fixed by the cable fixing member of this embodiment, and thereafter by using a calking tool (not shown), the cylinder part 8 of the intermediate member 3 is crimped and the intermediate member 3 is fastened to the cable 30. In the example shown in the figure, an annular crimping part 8a is formed so as to be sunk at two places of the cylinder part 8. Further, regarding the first bracket member 1 and the second bracket member 2, for example, the first bracket member 1 is made to slide along the direction of the groove 5 of the second bracket member 2, and the convex portion 11 of the first bracket member 1 is fitted with the concave portion 12 of the second bracket member 2, to thereby set a state that the first bracket member 1 and the second bracket member 2 are fitted into each other by the fitting part 10.

Subsequently, the attachment part 14 side of the first bracket member 1 and second bracket member 2, which are fitted into each other, is opened with the fitting part 10 as the rotation center, and as shown in FIG. 4, the cylinder part 8 of the intermediate member 3 fastened to the outer periphery of the three cables 30 is held between three opposed grooves 5 and 5 of the first bracket member 1 and the second bracket member 2. Thereafter, the bolt 7 is inserted into the insertion hole 15 of the attachment part 14 of the first bracket member 1 and the second bracket member 2, and further as shown in FIG. 5A, the bolt 7 is fastened and fixed to the attachment member 40 of the vehicle body, etc. Thus, the cable fixing structure of this embodiment is formed. By this cable fixing structure, the first bracket member 1 and the second bracket member 2 are fixed to the attachment member 40, and also the facing surfaces 4 and 4 of the first bracket member 1 and the second bracket member 2 are set in a tight contact state or a close contact state, and the cable 30 is clamped and fixed between the opposed grooves 5 and 5 of the first bracket member 1 and the second bracket member 2 respectively through the intermediate member 3. At this time, as shown in FIG. 5B, both side surfaces of the first bracket member 1 and the second bracket member 2 are set in a state of being in contact with the stopper parts 9 and 9 of the intermediate member 3, and a movement of the first bracket member 1 and the second bracket member 2 in an axial direction of the cable 30 can be regulated or inhibited by the stopper parts 9 and 9 of the both end portions of the cylinder part 8.

Figure 6:
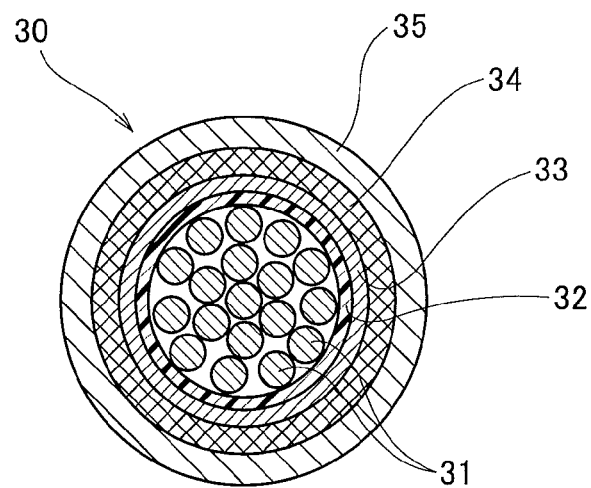
FIG. 6 is a transverse cross sectional view of the cable used in a cable fixing structure according to an embodiment of the present invention.

FIG. 6 shows an example of the cable 30 held and fixed to the vehicle body, etc. As shown in a transverse cross sectional view of FIG. 6, a cross sectional face of the cable 30 is formed into a circular shape, having a plurality of twisted conductors 31 in a central part, and an outer periphery of these conductors 31 is concentrically coated with an insulating body 32, a shield 33, a reinforcing braid 34, and a sheath 35 sequentially. The reinforcing braid 34 is obtained by weaving a fabric material such as resin and metal. By having the reinforcing braid 34 on the outer peripheral portion of the cable 30, when the cylinder part 8 of the intermediate member 3 is crimped, the crimping part 8a of the cylinder part 8 enters into the cables 30 effectively, to thereby firmly fix the intermediate member 3 to the cable 30, thus preventing an adverse influence on the cable structure (conductor 31, insulating body 32, and shield 33) in the reinforcing braid 34.

Note that the cable according to the present invention is not limited to the cable 30 shown in FIG. 6 of the above embodiment, and the cable of the present invention includes electric wire, etc. Specifically, the cable of the present invention includes cables such as a cable having electric power line for supplying electric power, a cable having a signal line for transmitting a signal, and a cable having the electric power line and the signal line. Further, the cable fixing member of the present invention is not limited to the cable for an automobile, and can be suitably used for a cable used in an environment receiving very strong vibrations.

Further, the first bracket member 1 and the second bracket member 2 of the above embodiment clamps and fix three cables 30. However, of course, the cables may also be clamped by a bracket member having one or a plurality of grooves other than three. However, when a layout of a plurality of cables is made, it is preferable to collectively clamp and fix the plurality of cables by a bracket member for the plurality of cables, from a viewpoint of workability and securing a fixing place.

According to this embodiment, one or a plurality of advantages as shown below can be obtained.

(1) The first bracket member and the second bracket member, being a pair of bracket members, are rotatably formed with the fitting part 10 as the rotation center, and can easily and speedily hold the cable 30 by opening and closing the facing surfaces 4 and 4 of the first bracket member 1 and the second bracket member 2, and can improve the workability of attaching and fixing the cable. Further, for example, an assembling accuracy of the cable 30 assembled to the vehicle body, etc., can be improved in such a manner that a slight adjustment is easy for solving the twisting of the cable 30 by slightly loosening the bolt 7, being a tightening member, and a cable layout as designed can be realized.

(2) A conventional metal clamp is provided with fixing parts at a plurality of places such as both end sides in a longitudinal direction and is fixed thereto by a bolt, etc. Therefore, the metal clamp is sized up. However, the cable fixing member of this embodiment has a structure that the first bracket member 1 and the second bracket member 2 are fitted into each other by the fitting part 10, and therefore the first bracket member 1 and the second bracket member 2 can be fixed by fastening using the bolt, etc., at only one place (attachment part 14), and therefore can be made more miniaturized than the conventional metal clamp.

(3) The conventional metal clamp has a small clamping and fixing force for the cable. However, the cable fixing member of this embodiment has a structure that the intermediate member 3 is firmly attached to the cable 30 by crimping, and the cable 30 is clamped and held by the first bracket member 1 and the second bracket member 2 through the intermediate member 3. Therefore, the cable 30 can be fixed by a sufficient clamping force. Particularly, since the stopper parts (protrusion parts) 9 and 9 are provided on both end portions of the cylinder part 8 of the intermediate member 3, and therefore even if an excessive tensile force is added to the cable 30, it can be received by the stopper part 9, and a positional deviation of the cable 30 can be prevented as much as possible. Particularly, foreign matters such as mud and snow are adhered to the cable which is provided under a vehicle spring, and the cable with the foreign matters adhered thereto is bent or vibrated in some cases, and at this time, the excessive tensile force is generated in the cable. However, in such a case as well, the cable can be adequately fixed and held.

(4) The cable 30 is clamped by being held by the first bracket member 1 and the second bracket member 2 through the intermediate member 3. Therefore, clamping forces of the first bracket member 1 and the second bracket member 2 to the cable 30 are equalized by the intermediate member 3, and therefore even if a great force works on the cable 30, an unexpected force is not added locally to the cable 30 of the cable fixing part, thus making it difficult to cause the positional deviation of a cable layout.

(5) An easy structure is achieved, such that the intermediate member 3 crimped and fastened to the cable 30 is held by the first bracket member 1 and the second bracket member 2 to thereby clamp the cable 30, and therefore a high reliability is obtained in an aspect of quality, and further a plurality of cables 30 can be collectively fixed, thus making it possible to reduce a cost.

Second Embodiment

Figure 7:
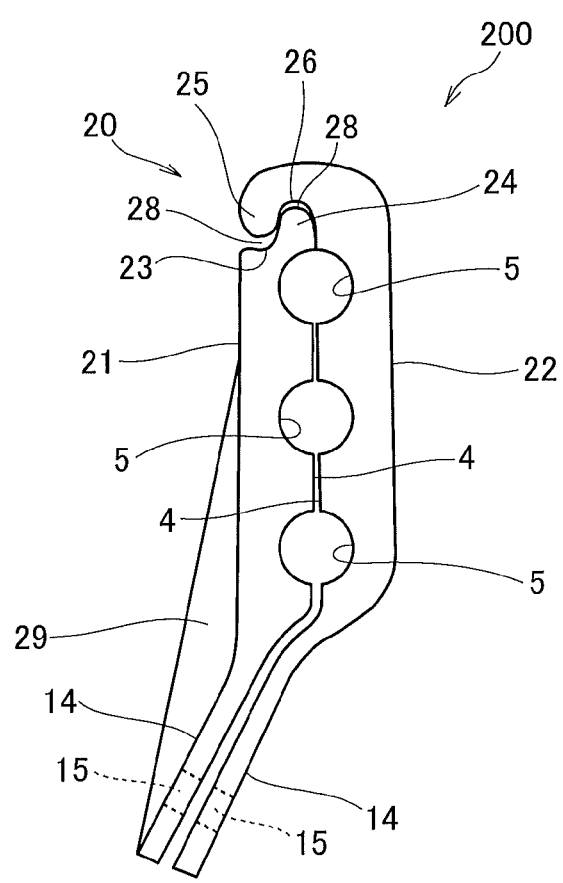
FIG. 7 is a side view showing a pair of bracket members in a cable fixing member according to a second embodiment of the present invention.

FIG. 7 is a side view showing a pair of bracket members in a cable fixing member according to a second embodiment of the present invention. The cable fixing member according to the second embodiment is also used for clamping the three cables and fixing them to the vehicle body, etc., and different points from the cable fixing member of the aforementioned first embodiment will be mainly described hereafter.

As shown in FIG. 7, a pair of bracket members that constitute a cable fixing member 200 of the second embodiment, is composed of a first bracket member 21 and a second bracket member 22. Further, a fitting part 20 of the first bracket member 21 and the second bracket member 22 is composed of a first convex portion 24 having an arc-shaped cross sectional face formed in one end portion of the first bracket member 21, and a second concave portion 26 having an arc-shaped cross sectional face formed in one end portion of the second bracket member 22.

A first concave portion 23 having an arc-shaped cross sectional face is provided adjacent to the first convex portion 24 of the first bracket member 21, and an S-shaped cross sectional shape is formed by the first convex portion 24 and the first concave portion 23. The first convex portion 24 is formed at the side of the facing surface 4, and the first concave portion 23 is formed at the opposite side to the side of the facing surface (the side away from the facing surface 4), which is a portion adjacent to the first convex portion 24. Further, a second convex portion 25 having an arc-shaped cross sectional face is provided adjacent to the second concave portion 26 of the second bracket member 22, and an S-shaped cross sectional shape is formed by the second concave portion and the second convex portion 25. The second concave portion 26 is formed at the facing surface 4 side, and the second convex portion 25 is formed at the opposite side to the side of the facing surface 4 (the side away from the facing surface 4), which is a portion adjacent to the second concave portion 26. As shown in FIG. 7, by fitting between the first convex portion 24 of the first bracket member 21 and the second concave portion 26 of the second bracket member 22, the first bracket member 21 and the second bracket member 22 are set in a fitting state. In this fitting state, gap 28 is formed between the opposed first convex portion 24 and second concave portion 25, and between the opposed first concave portion 23 and second convex portion 25. This is because, as will be described later, by rotation of the first bracket member 21 and the second bracket member 22 while contacting with or sliding over the fitting part 20 and the surface of its peripheral part, the first bracket member 21 and the second bracket member 22 are fitted into or removed from each other.

As shown in FIG. 7, the attachment part 14, being the other end portion of the first bracket member 21 and the second bracket member 22 is formed in an appearance of bending, with respect to the central part of the first bracket member 21 and the second bracket member 22 with three grooves 5 formed therein to clamp the cable. Thus, bending of the attachment part 14 is suitable from a viewpoint of an installation space or workability in some cases, when the cable is installed and fixed to a narrow place. The attachment part 14 is bent, and therefore rib 29 is provided on a surface opposite side to the facing surface 4 of the first bracket member 21, to improve strength of the bracket member. Further, the insertion hole 15 of the bolt is formed, similarly to the bracket members 1 and 2 of the first embodiment.

By relatively rotating the first bracket member 21 and the second bracket member 22 with the fitting part 20 as the rotation center, the first bracket member 21 and the second bracket member 22 are removed from each other. This structure will be described by using FIG. 8A to FIG. 8D.

Figure 8A:
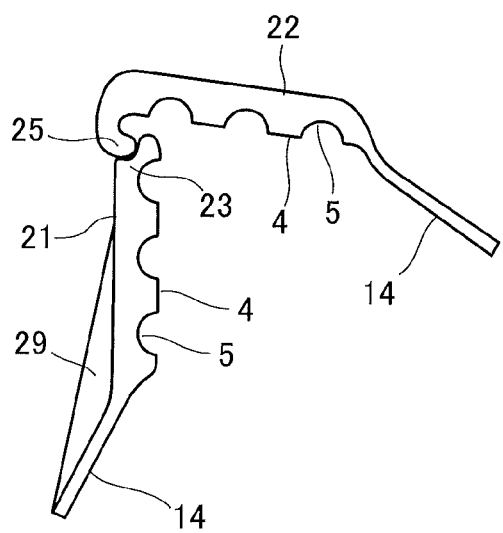
FIG. 8A is an explanatory view explaining a state that a pair of bracket members of FIG. 7 are fitted and removed.
Figure 8B:
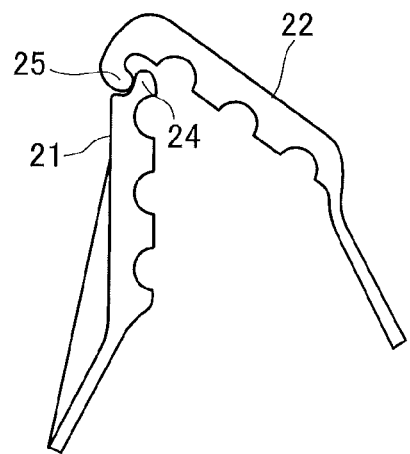
FIG. 8B is an explanatory view explaining a state that a pair of bracket members of FIG. 7 are fitted and removed.
Figure 8C:
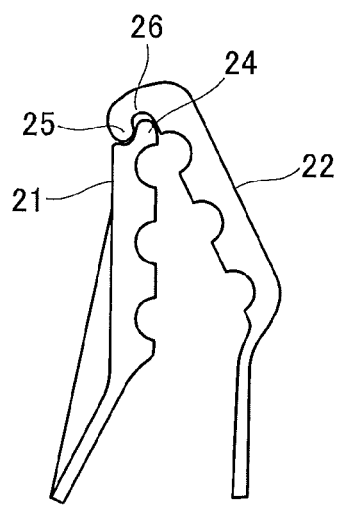
FIG. 8C is an explanatory view explaining a state that a pair of bracket members of FIG. 7 are fitted and removed.
Figure 8D:
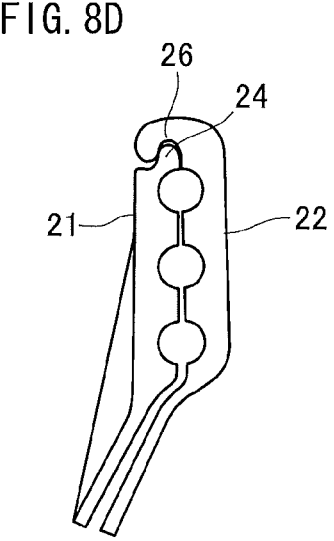
FIG. 8D is an explanatory view explaining a state that a pair of bracket members of FIG. 7 are fitted and removed.

As is shown in FIG. 8A, the surface of the first concave portion 23 of the first bracket member 21 and the surface of the second convex portion 25 of the second bracket member 22 are brought into contact with each other, to thereby rotate the first bracket member 21 and the second bracket member 22 in contact with each other in such a manner as mutually sliding in a direction that the facing surface 4 of the first bracket member 21 and the facing surface 4 of the second bracket member 22 are closed to each other. Note that FIG. 8A to FIG. 8D show a state that the second bracket member 22 is rotated. Further, as is shown in the figure, as the rotation of the second bracket member 22 (or the first bracket member 21) is continued to FIG. 8B, FIG. 8C, and FIG. 8D, the fitting part 20 of the first bracket member 21 and the second bracket member 22 and a contact part of a portion adjacent thereto are changed, and finally the surface of the first convex portion 24 of the first bracket member 21 and the surface of the second concave portion 26 of the second bracket member 22 are brought into contact with each other in a fitting state. On the contrary, by rotating the first bracket member 21 and the second bracket member 22 so as to be continued to FIG. 8C, FIG. 8B, and FIG. 8A, the first bracket member 21 and the second bracket member 22 are removed from each other.

Thus, the first bracket member 21 and the second bracket member 22 of this embodiment can be fitted into and removed from each other by a mutual relative rotation, thus more facilitating an attachment and fixing work of the cable than a case of the first bracket member 1 and the second bracket member 2 of the aforementioned first embodiment. Further, similarly to the first embodiment, a high degree of freedom in attaching and fixing method of the cable is obtained, such that the cable may be held by the first bracket member 21 and the second bracket member 22 in the fitting state, or the cable may be held by the first and the second bracket members 21 and 22 by inserting the cable into the groove 5 of either one bracket member of the first bracket member 21 and the second bracket member 22 and thereafter fitting into the other bracket member.

Figure 9:
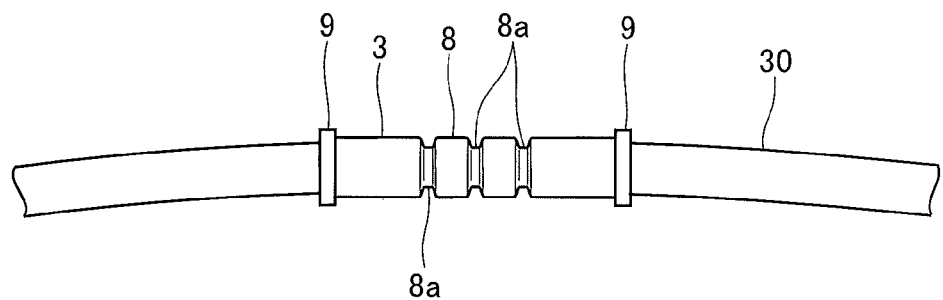
FIG. 9 is a view showing a state that an intermediate member in a cable fixing member according to a second embodiment of the present invention is fastened by being calked by a cable.

In this embodiment as well, the intermediate member 3 is composed of the cylinder part 8 and the stopper parts (protrusion parts) 9 of both end portions, and as shown in FIG. 9, the cylinder part 8 is attached to the cable 30 by crimping thereto at three places. An inner surface shape of the groove 5 of the first bracket member 21 and the second bracket member 22 of this embodiment is formed so as to mesh with an outer surface shape of the cylinder part 8, corresponding to the outer surface shape of the cylinder part 8 having the crimping part 8a formed so as to be annularly sunk at three places.

Figure 10A:
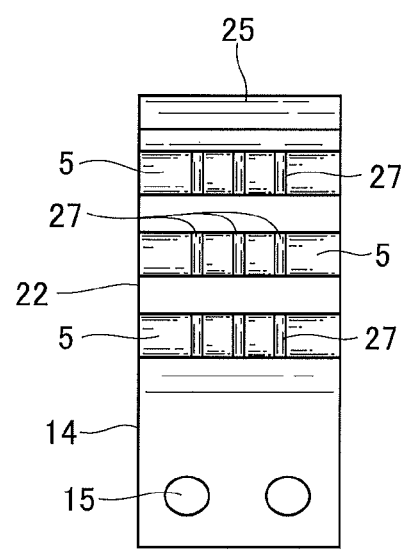
FIG. 10A is a view showing a facing surface side of a second bracket member 22 of FIG. 7.
Figure 10B:
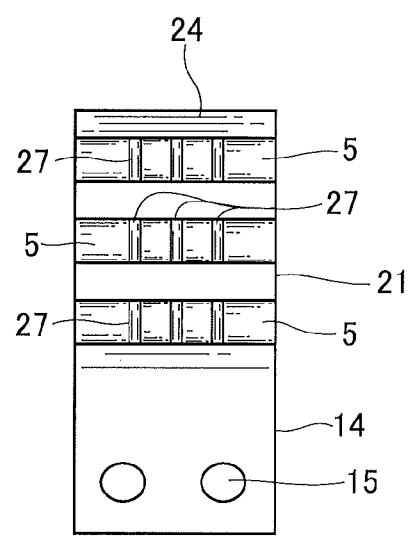
FIG. 10B is a view showing a facing surface side of a first bracket member 21 of FIG. 7.
Figure 11:
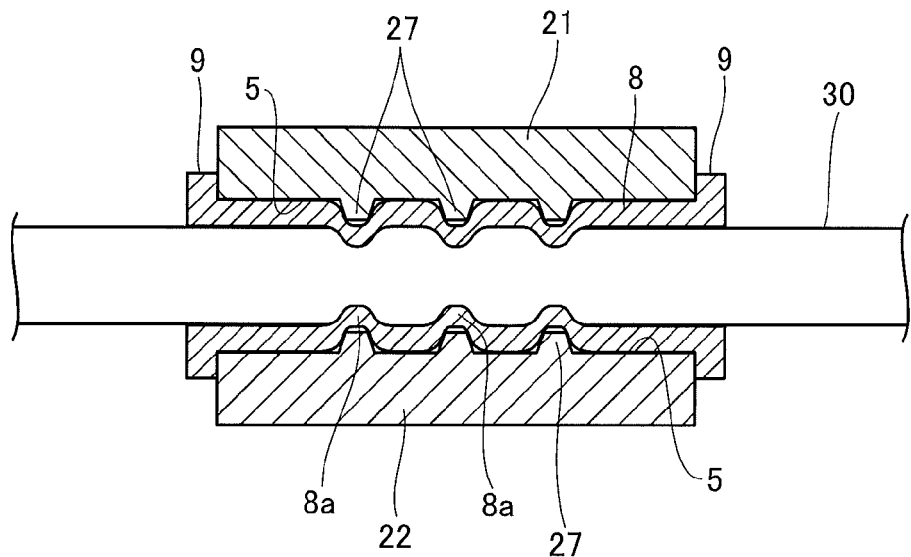
FIG. 11 is a cross sectional view of a state that the cable fixing member of the second embodiment of the present invention is fixed to a cable.

Namely, as shown in FIG. 10A and FIG. 10B, a projected portion 27 along the peripheral direction of the groove 5, is formed at three places on an inner surface of the groove 5 with a semi-circular cross sectional face of the first bracket member 21 and the second bracket member 22, so as to correspond to the crimping part 8a formed so as to sink at these three places. Therefore, if the cylinder part 8 of the intermediate member 3 crimped and fastened to the cable 30 is clamped by being held between the grooves 5 and 5 of the first bracket member 21 and the second bracket member 22, as shown in FIG. 11, the projected portion 27 is meshed with a depressed portion of an outer surface of the crimping part 8a of the cylinder part 8. Accordingly, in this embodiment, a positional deviation of the cable 30 in the axial direction can be further strongly prevented, by a meshing structure of the projected portion 27 of the groove 5 and the depressed portion of the outer surface of the crimping part 8a, in addition to a structure of the stopper part 9 similar to the structure of the first embodiment.

Note that in this embodiment, the intermediate member 3 is used for fixing the cable 30. However, the cable 30 may also be held and clamped directly by the first bracket member 21 and the second bracket member 22, not through the intermediate member 3.

Third Embodiment

Figure 12:
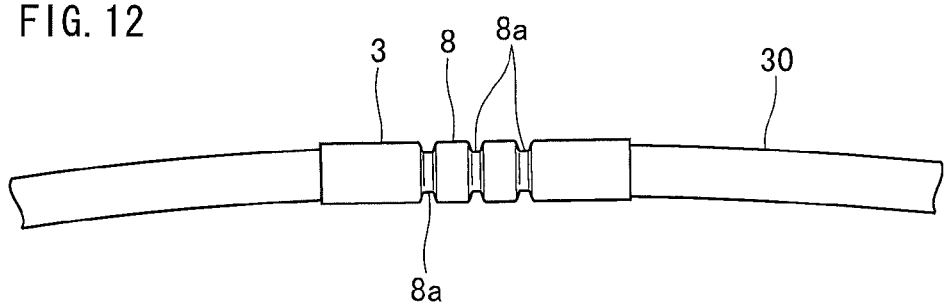
FIG. 12 is a view showing a state that an intermediate member in a cable fixing member according to a third embodiment of the present invention is fastened by being calked by a cable.
Figure 13:
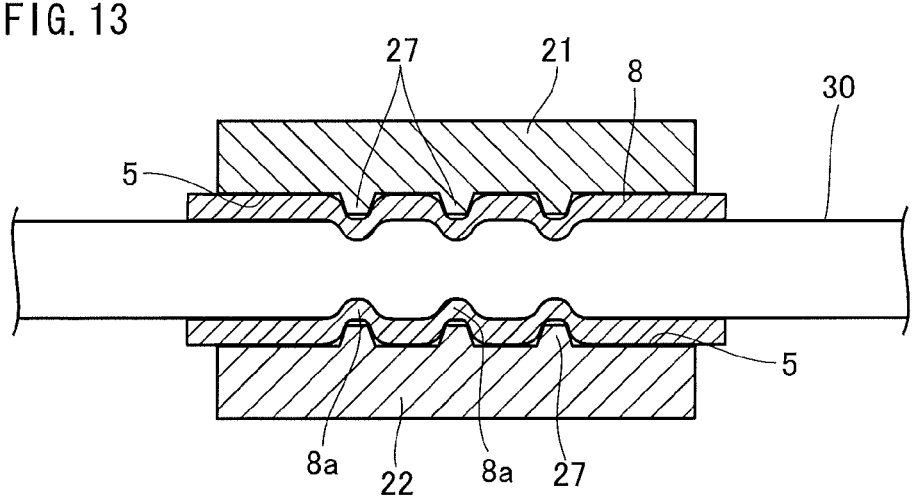
FIG. 13 is a cross sectional view of a state that the cable fixing member according to the third embodiment of the present invention is fixed to the cable.

FIG. 12 is a view showing a state that an intermediate member in a cable fixing member according to a third embodiment of the present invention is crimped and fastened to the cable, and FIG. 13 is a cross sectional view of a state that the cable fixing member according to the third embodiment is fixed to the cable.

The intermediate member 3 of the third embodiment has a structure that the stopper part 9 of the second embodiment is omitted. Namely, as shown in FIG. 12, the intermediate member 3 of this embodiment is composed of the cylinder part 8 and is fastened to the cable 30 by crimping the central part of the cylinder part 8 thereto at three places. Further, as shown in FIG. 13, similarly to the aforementioned second embodiment, the projected portion 27 along the peripheral direction of the groove 5 is formed at three places in the direction of the groove 5, corresponding to the crimping part 8a formed so as to sink annularly.

If the cylinder part 8 crimped and fastened to the cable 30 is clamped by being held between the grooves 5 and 5 of the pair of bracket members 21 and 22, as shown in FIG. 13, the projected portion 27 of the groove 5 is meshed with the depressed portion of the outer surface of the crimping part 8a of the cylinder part 8. Namely, in this embodiment, the positional deviation of the cable 30 in the axial direction can be prevented by the meshing structure of the projected portion 27 and the crimping part 8a.

What is claimed is:

1. A cable fixing member, comprising:
a pair of bracket members that have first and second bracket members disposed face to face with each other and hold a cable by facing surfaces of first and second bracket members;
and a fitting part with which the pair of bracket members are selectively engageable and disengageable with each other by rotation,
wherein the fitting part comprises:
a concave portion having an arc-shaped cross sectional face formed in the first bracket member of the pair of bracket members; a convex portion formed in the second bracket member of the pair of bracket members and having an arc-shaped cross sectional face with which the concave portion is engaged,
wherein the pair of bracket members are selectively engageable and disengageable with each other by rotation with the fitting part as a rotation center, so that the facing surfaces of the pair of bracket members that hold the cable are opened and closed,
wherein the concave portion has a depth covering the convex portion in a state in which the convex portion is fitted into the concave portion; and
wherein sizes of the concave portion and the convex portion of the fitting part are set to sizes in which when the first and second bracket member are rotated from a state in which the facing surfaces open to a state in which the facing surfaces close, the convex portion is changeable from a state of removing from the concave portion to a state of fitting into the concave portion; and
in which the first and second bracket members are rotated from the state in which the facing surfaces close to a state in which the facing surfaces open, the convex portion is changeable from the state of fitting into the concave portion to the state of removing from the concave portion while a second convex portion on a side of the concave portion and a second concave portion on a side of the convex portion are kept in contact with each other.

2. The cable fixing member according to claim 1, wherein when the pair of bracket members are engaged with each other, a gap is formed between a portion adjacent to the concave portion on a side opposite to the facing surface of the first bracket member and a portion adjacent to the convex portion on a side opposite to the facing surface of the second bracket member, so that the pair of bracket members are rotatably engaged with each other with the fitting part as a rotation center.

3. The cable fixing member according to claim 1, wherein when the pair of bracket members are engaged with each other, a gap is formed between a portion adjacent to the concave portion on a side opposite to the facing surface of the first bracket member and a portion adjacent to the convex portion on a side opposite to the facing surface of the second bracket member, so that the pair of bracket members are engageable or disengageable by rotating the pair of bracket members relatively.

4. The cable fixing member according to claim 1, further comprising:
an intermediate member having a cylinder part into which the cable is inserted,
wherein the intermediate member is crimped and fastened to the cable by a crimping part that is formed in the cylinder part and projects toward a center of the cable, so that the cable is held between the pair of bracket members through the intermediate member when the pair of bracket members are engaged with each other with the fitting part as a rotation center.

5. The cable fixing member according to claim 1, further comprising:
an intermediate member crimped and fastened to the cable; and
one or a plurality of grooves that hold the cable through the intermediate member formed on the facing surfaces of the pair of bracket members,
wherein protrusion parts for regulating a movement of the pair of bracket members in an axial direction of the cable are formed on respective end portions of the intermediate member in the axial direction of the cable.

6. The cable fixing member according to claim 1, further comprising a tightening member that tightens the pair of bracket members that hold one or a plurality of cables.

7. A cable fixing structure that fixes a cable, having a reinforcing braid on an outer peripheral part of the cable, to an attachment member using the cable fixing member of claim 1.

8. The cable fixing member according to claim 4, wherein one or a plurality of grooves are formed on each of the facing surfaces of the pair of bracket members that hold the cable through the intermediate member,
   wherein an inner surface shape of the one or plurality of grooves is formed to mesh with an outer surface shape of the intermediate member crimped and fastened to the cable, and
   wherein a projected portion is formed on an inner surface of one or a plurality of grooves that is meshed with a depressed portion of the crimping part of the intermediate member.

9. The cable fixing member according to claim 4, wherein a stopper part is formed on each end face of the cylinder part, and when the pair of the bracket members sandwich the cable through the intermediate member, each side face of the pair of the bracket members comes in contact with respective stopper parts.

10. A member for fixing a cable, the member comprising:
   a first bracket member having a first clamping surface, a first groove provided along the clamping surface, and a first fitting portion having a first concave surface and a first convex surface; and
   a second bracket member having a second clamping surface, a second groove provided along the clamping surface, and a second fitting portion having a second concave surface and a second convex surface;
   wherein the first and second bracket members are selectively engageable and disengageable with each other by rotation at the first and second fitting portions, the first concave surface adjacent the second convex surface and the first convex surface adjacent the second concave surface thereby permitting pivoting of one of the first or second bracket member with respect to the other of the first or second bracket member between an open position and a clamped position,
   wherein the first and second clamping surfaces are pressed together in the clamped position, and the first groove and the second groove are correspondingly opposed to each other in the clamped position thereby defining a clamping hole for holding the cable in the clamped position,
   wherein sizes of the first and second concave surfaces and the first and second convex surfaces are set to sizes in which when the first and the second bracket members are rotated from a state in which the first and second clamping surfaces open to a state in which the first and second clamping surfaces are clamped, the first and second convex surfaces are changeable from a state of having the second convex surface contacting the first concave surface to a state of having the first convex surface contacting the second concave surface, and
   in which when the first and second bracket members are rotated from the state in which the first and the second clamping surfaces are clamped to the state in which the first and second clamping surfaces are open, the first and second convex surfaces are changeable from the state of having the first convex surface contacting the second concave surface to the state of having the second convex surface contacting the first concave surface.

11. The cable fixing member according to claim 10, wherein each first and second bracket member further includes an insertion hole, the insertion hole of the first bracket member substantially aligned with the insertion hole of the second bracket member in order to mutually receive a fixation member in the clamped position.

12. The cable fixing member according to claim 11, wherein the fixation member is connected to an attachment member.

13. The cable fixing member according to claim 11, wherein the insertion holes are oriented laterally with respect to the clamping hole.

14. The cable fixing member according to claim 10, further comprising an intermediate member fastened to a portion of the cable, the intermediate member receivable within the clamping hole.

15. The cable fixing member according to claim 14, wherein the intermediate member includes a cylindrical part and a protrusion on each end of the cylindrical part, the cylindrical part receivable within the clamping hole and the protrusions operative to restrict the cylindrical part from sliding out of the clamping hole.

16. The cable fixing member according to claim 15, wherein the intermediate member further includes an annular crimping part having a sunken portion for engaging the cable.

17. The cable fixing member according to claim 10, wherein the first concave surface and the second convex surface are pressed together in the clamped position, and a gap is formed between the second concave surface and the first convex surface.

18. The cable fixing member according to claim 10, wherein the first and second bracket members are separable in the open position.

19. The cable fixing member according to claim 1, wherein the concave portion and the convex portion engage in a state that the facing surfaces of the pair of bracket members come in contact with each other.

20. The cable fixing member according to claim 1, wherein the fitting part is configured so that the pair of bracket members can be engaged or disengaged by relative sliding of the concave portion and the convex portion in a direction of an axis of rotation of the pair of bracket members.

21. A cable fixing member, comprising:
   a pair of bracket members that have first and second bracket members disposed face to face with each other and hold a cable by facing surfaces of first and second bracket members; and
   a fitting part with which the pair of bracket members are selectively engageable and disengageable with each other by rotation,
   wherein the fitting part comprises:
   a concave portion having an arc-shaped cross sectional face formed in the first bracket member of the pair of bracket members;
   a convex portion formed in the second bracket member of the pair of bracket members and having an arc-shaped cross sectional face with which the concave portion is engaged,
   wherein the pair of bracket members are selectively engageable and disengageable with each other by rotation with the fitting part as a rotation center, so that the facing surfaces of the pair of bracket members that hold the cable are opened and closed, and
   wherein when the facing surfaces of the pair of bracket members are closed the convex portion is fitted into the concave portion and when the facing surfaces of the pair of bracket members are opened the convex portion is removed from the concave portion, while a second convex surface on a side of the concave portion and a second concave portion adjacent to the convex portion are kept in contact with each other.

* * * * *